US007874075B2

(12) United States Patent
Niwa et al.

(10) Patent No.: US 7,874,075 B2
(45) Date of Patent: Jan. 25, 2011

(54) PORTABLE CUTTING MACHINE

(75) Inventors: Kenji Niwa, Ibaraki (JP); Teruo Imai, Ibaraki (JP)

(73) Assignee: Hitachi Koki Co., Ltd., Tokyo (JP)

( * ) Notice: Subject to any disclaimer, the term of this patent is extended or adjusted under 35 U.S.C. 154(b) by 0 days.

(21) Appl. No.: 12/205,265

(22) Filed: Sep. 5, 2008

(65) Prior Publication Data

US 2009/0064510 A1 Mar. 12, 2009

(30) Foreign Application Priority Data

Sep. 7, 2007 (JP) ............................. 2007-233397

(51) Int. Cl.
*B23D 47/02* (2006.01)
*B23D 45/16* (2006.01)

(52) U.S. Cl. .......................................... 30/377; 30/390

(58) Field of Classification Search ................... 30/374, 30/375, 377, 390, 391
See application file for complete search history.

(56) References Cited

U.S. PATENT DOCUMENTS 1,854,510 A * 4/1932 Haas ........................... 30/376
3,262,472 A * 7/1966 McCarty et al. ............... 30/376
4,589,208 A * 5/1986 Iwasaki et al. ................ 30/376
4,856,394 A * 8/1989 Clowers ........................ 83/56
5,239,756 A * 8/1993 Matzo et al. .................. 30/371
5,570,511 A * 11/1996 Reich et al. ................... 30/376
7,434,321 B2 * 10/2008 Niwa et al. ................... 30/376
7,516,553 B2 * 4/2009 Yoshida et al. ................ 30/391
2005/0217124 A1 * 10/2005 Fuchs et al. ................... 30/377

FOREIGN PATENT DOCUMENTS

JP 3-29221 A 3/1991
JP 2607480 Y 6/2001

OTHER PUBLICATIONS

Chinese Office Action, w/ English translation thereof, issued in Chinese Patent Application No. CN 200810214366.3 dated Oct. 30, 2009.

* cited by examiner

*Primary Examiner*—Hwei-Siu C Payer
(74) *Attorney, Agent, or Firm*—McDermott Will & Emery LLP

(57) ABSTRACT

According to an aspect of the present invention, there is provided a portable cutting machine including: a housing; a motor; a cutting blade driven by the motor; a saw cover that covers the cutting blade; a base that rotatably supports the saw cover and to be brought into contact with the to-be-processed members; and a changing mechanism capable of changing the protrusion amount of the cutting blade toward the side opposite to the saw cover, wherein the changing mechanism has an adjustment guide extending from the base in the rotation direction of the saw cover and a movement restricting part for restricting the movement of the adjustment guide, and wherein the portion of the adjustment guide on the side farther from the base with respect to the movement restricting part is arranged outside of the saw cover.

3 Claims, 10 Drawing Sheets

PORTABLE CUTTING MACHINE

CROSS-REFERENCE TO RELATED APPLICATIONS

This application is based upon and claims a priority from prior Japanese Patent Application No. 2007-233397 filed on Sep. 7, 2007, the entire contents of which are incorporated herein by reference.

BACKGROUND OF THE INVENTION

1. Field of the Invention

An aspect of the present invention relates to portable cutting machines and, in particular, to a portable cutting machine adjustable in cutting depth.

2. Description of the Related Art

There have conventionally been portable cutting machines achieved by making cutting machines portable for cutting and processing to-be-processed members such as lumber. Such portable cutting machines, which consist mainly of a circular saw blade and a motor as a drive unit, are easily taken anywhere and thus used generally not only in manufacturing plants but also at construction sites and the like.

Since lumber to be cut by portable cutting machines has respective different thicknesses, it is necessary that various types of boards, from thick to thin boards, can be cut suitably. Conventional portable cutting machines are arranged in such a manner that a saw cover or a housing on which a circular saw blade is supported is rotatable with respect to a base to be brought into contact with lumber and the amount of rotation thereof determines the amount of protrusion of the circular saw blade from the base.

For example, in the portable cutting machine 901 shown in FIGS. 12A and 12B, the saw cover 904 covering the circular saw blade 903 is supported rotatably centering on the support part 961 with respect to the base 906. The movement restricting part 905 connected with the saw cover 904 is adapted to slide along the link 907 to cause the saw cover 904 on which the circular saw blade 903 is supported to be rotated with respect to the base 906 and thereby the amount of protrusion of the circular saw blade 903 to be changed. Specifically, the movement restricting part 905 moves upward along the path indicated by the broken line B so that the amount of protrusion of the circular saw blade 903 decreases. In the drawings, the broken line B forms a circular arc with a radius of R centering on the support part 961, where R represents the distance from the support part 961 to the point where the movement restricting part 905 and the link 907 are in contact with each other. Therefore, the link 907 is fixed to the saw cover 904 on the broken line B by the movement restricting part 905.

However, forming the link 907 along the broken line B causes the saw cover 904 that covers the link 907 to grow in size. Hence, the link 907 may be formed by an elastic thin plate in such a manner as to be housed in the saw cover 904 as shown in FIG. 12A. In this arrangement, the higher the movement restricting part 905 is positioned, the greater the tensile force required to arrange the link 907 on the broken line B, resulting in a problem of difficulty in movement of the movement restricting part 905.

Hence, the portable cutting machine disclosed in JP-UM-H03-29221-A is provided with a dust case connected with a saw cover to prevent chips from attaching to the link by sucking chips from the saw cover into the dust case.

However, the arrangement disclosed in JP-UM-H03-29221-A has a high possibility that chips are not sucked completely due to, for example, reduction in the suction power of the dust case. Leftover chips will attach to the link to become resistance when the movement restricting part slides, resulting in a reduction in the operating efficiency.

SUMMARY OF THE INVENTION

It is therefore an object of the present invention to provide a small-sized portable cutting machine whereby the operating efficiency can be improved.

In order to achieve the foregoing object, the present invention provides a portable cutting machine including: a housing; a motor housed in the housing; a cutting blade adapted to be driven by the motor to cut to-be-processed members; a saw cover provided in the housing to cover approximately the half of the outer periphery of the cutting blade; a base adapted to rotatably support the saw cover or the housing and to be brought into contact with the to-be-processed members; and a protrusion amount changing mechanism capable of changing the amount of protrusion of the cutting blade from the base toward the side opposite to the saw cover, in which the protrusion amount changing mechanism has an adjustment guide extending from the base in the rotation direction of the saw cover and a movement restricting part for restricting the movement of the adjustment guide with respect to the saw cover, and in which the portion of the adjustment guide on the side farther from the base with respect to the movement restricting part is arranged outside of the saw cover.

It is preferable to further include a guide cover for covering the portion of the adjustment guide on the side farther from the base with respect to the movement restricting part.

It is preferable that the guide cover is formed detachably to the saw cover.

It is preferable that the saw cover is defined with an opening portion formed in the surface on the side farther from the motor and an air passage communicating from the front of the cutting blade in the cutting direction to the opening portion, and a guide portion for guiding air from the side nearer the motor toward the side farther from the motor is formed in the air passage in the vicinity of the opening portion.

It is preferable that the housing is formed with a handle part protruding from the housing toward the side opposite to the cutting blade, and the handle part and the guide cover are each formed of resin.

EFFECT OF THE INVENTION

According to the portable cutting machine of the first aspect of the invention, since the portion of the adjustment guide on the side farther from the base with respect to the movement restricting part is arranged outside of the saw cover, chips generated inside of the saw cover cannot attach to the portion of the adjustment guide on the side farther from the base with respect to the movement restricting part. Therefore, chips cannot attach to the portion of the adjustment guide on the side farther from the base with respect to the movement restricting part to interfere with the sliding of the movement restricting part. Also, since there is no need to ensure a space for housing the adjustment guide inside the saw cover, the size of the saw cover can be reduced. Further, the guide member on the side farther from the base with respect to the movement restricting part can be replaced, if desired, without dismounting the saw cover from the base, which exhibits an improved assemblability.

According to the portable cutting machine of the second aspect of the invention, since there is further provided a guide cover formed detachably to the saw cover and adapted to cover the portion of the adjustment guide on the side farther from the base with respect to the movement restricting part, extraneous shocks can be absorbed by the guide cover, which can prevent the adjustment guide from being deformed. Although the portable cutting machine is often used in environments where dust such as wood debris circulates, the provision of the guide cover can prevent dust circulating outside from attaching to the adjustment guide.

According to the portable cutting machine of the third aspect of the invention, since the guide cover is formed detachably to the saw cover, maintenance operations such as cleaning of the adjustment guide and saw cover can be performed easily by dismounting the guide cover from the saw cover, which exhibits an improved workability.

According to the portable cutting machine of the fourth aspect of the invention, since a guide portion for guiding air from the side nearer the motor toward the side farther from the motor is formed in the air passage in the vicinity of the opening portion, chips generated when cutting to-be-processed members with the cutting blade pass through the air passage defined inside the saw cover to be guided away from the motor by the guide portion, and then discharged through the opening portion. This arrangement makes it less likely that chips stay inside the saw cover, which reduces the possibility that chips attach to the adjustment guide and movement restricting part, etc. Further, since housings with a motor housed therein do not have a planar shape, but rather often have a shape corresponding to that of the motor, it would be difficult to remove chips that may be discharged on the side nearer the motor. Meanwhile, on the side farther from the motor, there are no obstacles to interfere with removal of chips, whereby chips can be easily removed.

According to the portable cutting machine of the fifth aspect of the invention, the handle part and guide cover are each formed of resin. Therefore, even if the portable cutting machine may be placed on an installation surface such as a floor in such a manner that the vicinity of the handle part and guide cover is in contact with the installation surface, the installation surface is less likely to be damaged, which exhibits an improved convenience.

BRIEF DESCRIPTION OF THE DRAWINGS

Embodiments of the present invention will be described in detail based on the following figures, wherein:

FIG. 8A is an illustrative view showing an engagement between;

FIG. 8B is a side view showing a non-rotatable state between;

FIG. 11A is a side view showing a non-rotatable state between;

DETAILED DESCRIPTION OF THE INVENTION

Figure 1:
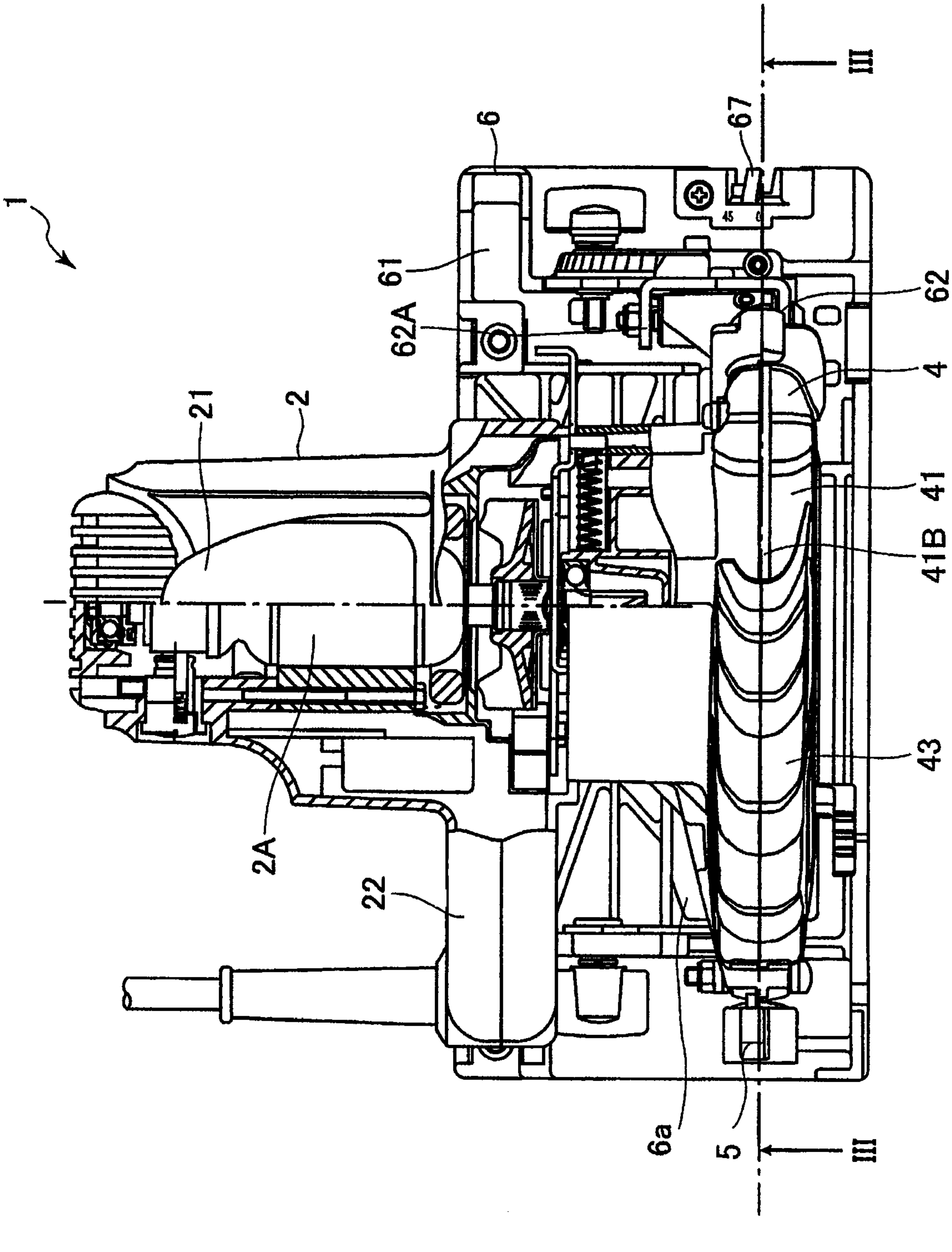
FIG. 1 is a plan view of a portable cutting machine according to an embodiment of the present invention.
Figure 2:
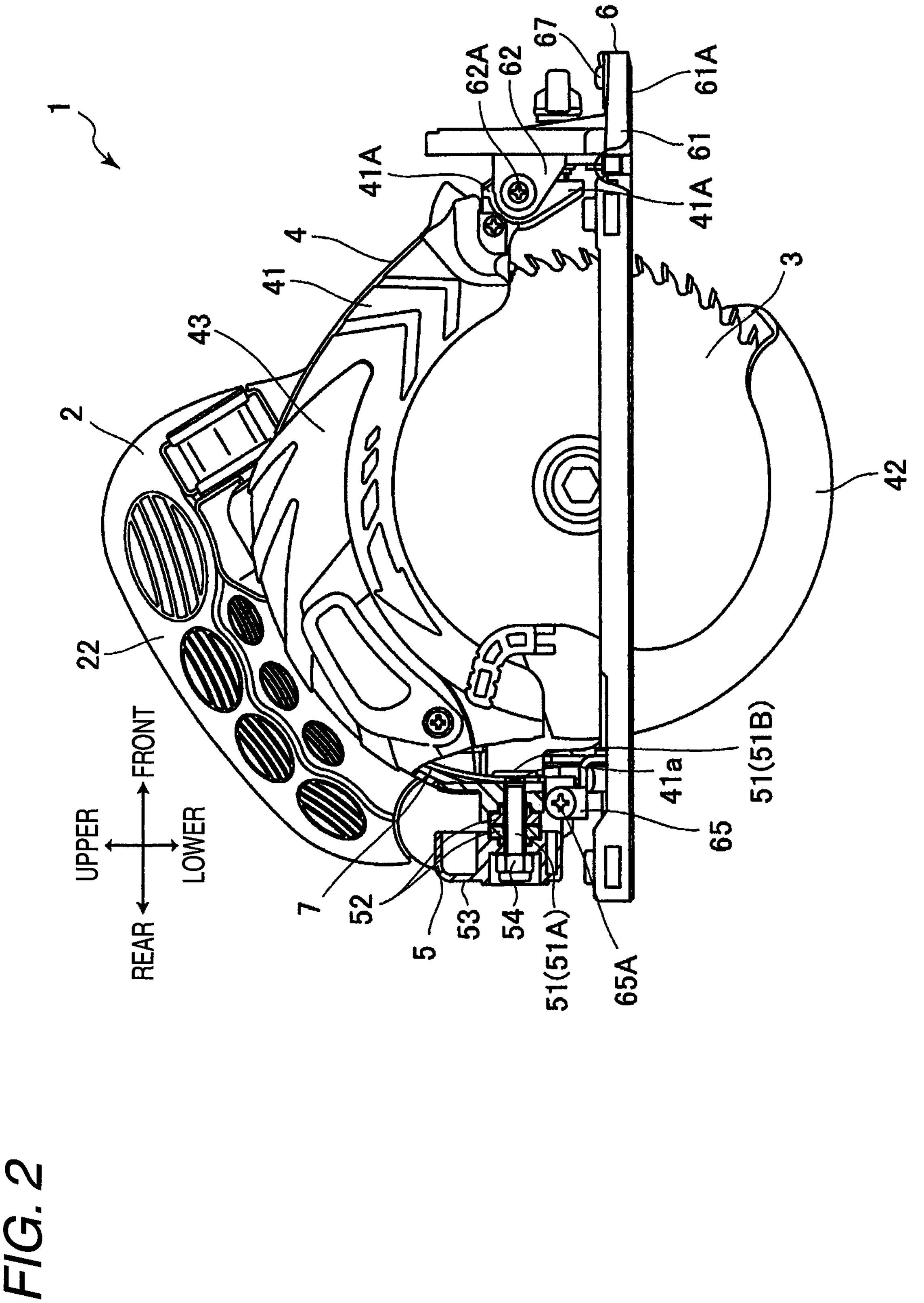
FIG. 2 is a side view on the side opposite to the motor of the portable cutting machine according to the embodiment of the present invention.
Figure 3:
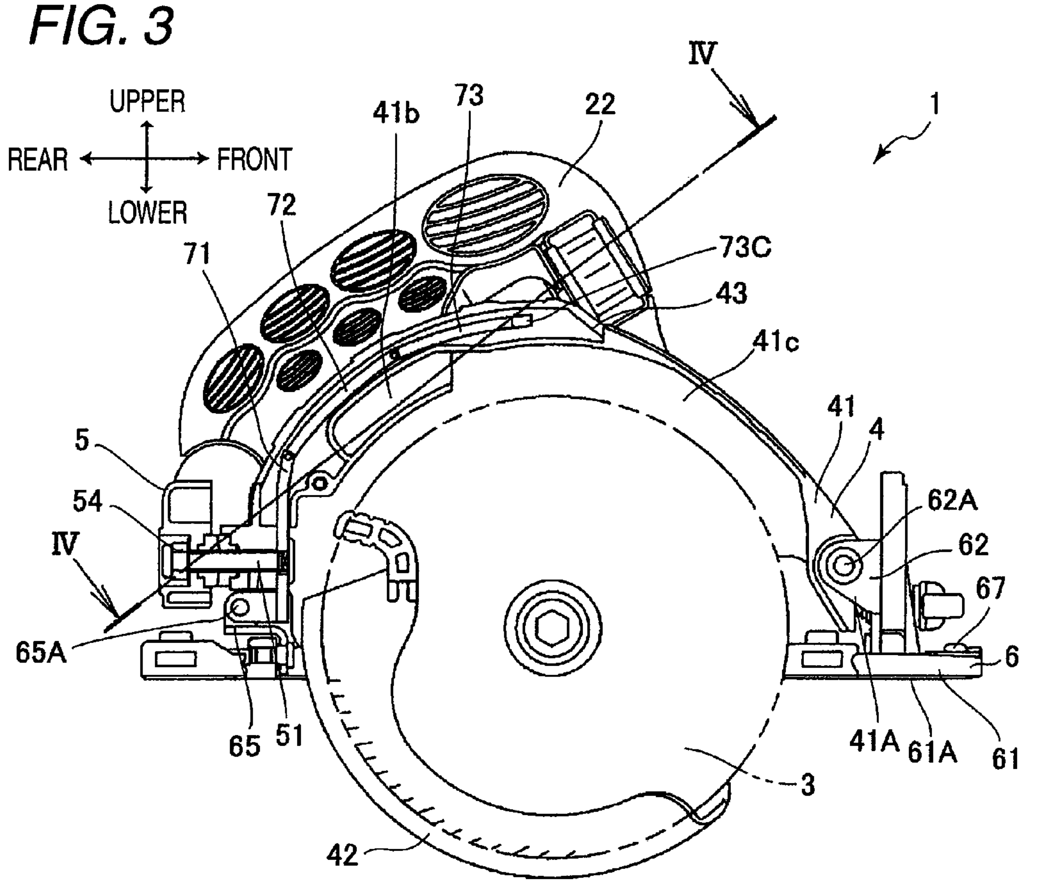
FIG. 3 is a cross-sectional view along the cross section III-III in FIG. 1.

A portable cutting machine according to an embodiment of the present invention will be described with reference to FIGS. 1 to 11B. The circular saw 1 shown in FIGS. 1 to 3 is an exemplary portable cutting machine, consisting mainly of a housing 2, a circular saw blade 3, a saw cover 4, and a base 6.

The housing 2 consists mainly of a housing part 21 with a motor 2A housed therein and a handle part 22 formed integrally with the housing part 21. Also, a drive system (not shown in the drawings) adapted to be driven by the motor 2A is provided inside the saw cover 4, and the drive system allows rotation of the circular saw blade 3.

The handle part 22 is made of resin, and is provided with a switch (not shown in the drawings) for controlling the drive of the motor 2A and a stopper (not shown in the drawings) for keeping the switch ON.

The saw cover 4 is connected and provided on the side of the handle part 22 opposite to the housing part 21 in the housing 2. As shown in FIG. 2, the saw cover 4 consists mainly of a saw cover main body 41 connected with the housing 2, a safety cover 42 provided on the saw cover main body 41, and a guide cover 43 provided detachably to the saw cover main body 41, and covers the circular saw blade 3.

The saw cover main body 41 is made of metal, and as shown in FIG. 2, covers approximately the half of the circular saw blade 3. On one end side in the circumferential direction of the saw cover main body 41 is defined a connection 41A connected with a rotation support axis 62 to be described hereinafter. A rib 41B is provided at the position where the saw cover main body 41 intersects with a plane including the side surface of the circular saw blade 3 (refer to FIG. 1). The other end side in the circumferential direction of the saw cover main body 41 has a through hole 41*a* formed on an extension of the rib 41B, and a movement restricting part 5 for restricting the movement of a link 7 (to be described hereinafter) with respect to the saw cover main body 41 is arranged in the through hole 41*a*.

As shown in FIG. 2, the movement restricting part 5 consists mainly of a bolt 51, a washer 52, a rotation operating part 53, and a nut 54. The bolt 51 includes an axis portion 51A, a collar portion 51B provided on the base end side of the axis portion 51A and engaged with the link 7, and a rectangular portion 51C positioned between the axis portion 51A and the collar portion 51B and having an approximately square cross section orthogonal to the axial direction of the axis portion 51A. The washer 52 has a through hole formed at approximately the center thereof. When the washer 52 is fitted and held in the saw cover main body 41 in a non-rotatable manner around the axis of the through hole, the axis portion 51A of the bolt 51 is inserted into the through hole. The rotation operating part 53 is arranged on the washer 52 so as to be in contact with the washer 52, and the axis portion 51A of the bolt 51 is inserted into the through hole.

Figure 4:
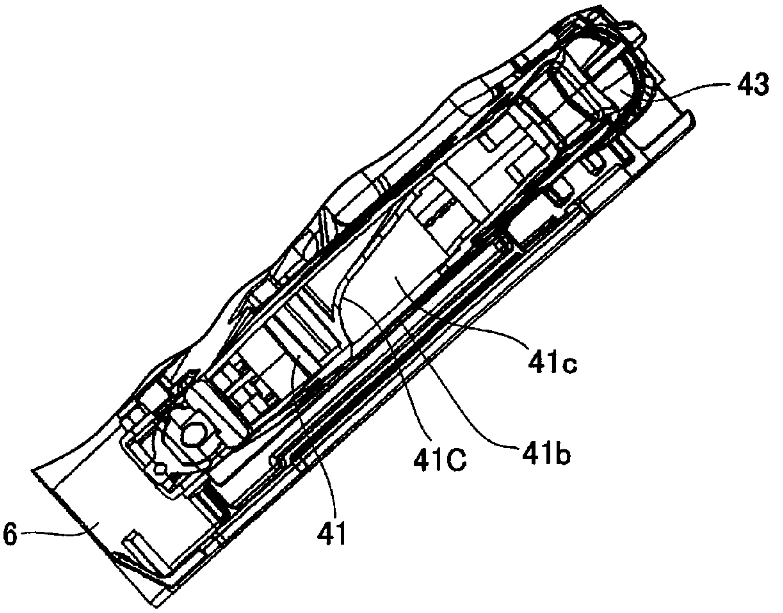
FIG. 4 is a partial cross-sectional view along the cross section IV-TV in FIG. 3, showing a saw cover in the portable cutting machine according to the embodiment of the present invention.

FIG. 4 is a partial cross-sectional view showing the inside of the saw cover main body 41. As shown in FIG. 4, the saw cover main body 41 is defined with an opening portion 41*b* formed in the surface on the side farther from the motor 2A and an air passage 41*c* communicating from the front of the circular saw blade 3 in the cutting direction to the opening portion 41*b*. A guide portion 41C for guiding air from the side nearer the motor 2A toward the side farther from the motor 2A is formed in the air passage 41*c* in the vicinity of the opening portion 41*b*.

According to the arrangement above, chips generated when cutting to-be-processed members with the circular saw blade 3 pass through the air passage 41*c* defined inside the saw cover main body 41 to be guided away from the motor 2A by the guide portion 41C, and then discharged through the opening portion 41*b*. This makes it less likely that chips stay inside the saw cover main body 41, which reduces the possibility that chips attach to the link 7 and movement restricting part 5, etc. Further, since the housing 2 with the motor 2A housed therein often has a shape corresponding to that of the motor 2A, it would be difficult to remove chips that may be discharged on the side nearer the motor 2A. Meanwhile, on the side farther from the motor 2A, there are no obstacles to interfere with removal of chips, whereby chips can be easily removed.

As shown in FIG. 2, on the other end side in the circumferential direction of the saw cover main body 41, the safety cover 42 is provided rotatably in the circumferential direction along the outer edge of the saw cover main body 41. A spring (not shown in the drawings) is interposed between the saw cover main body 41 and the safety cover 42 to urge the safety cover 42 against the saw cover main body 41 in the counterclockwise direction in the drawing. Thus, if no cutting operation is performed, the safety cover 42 covers a portion of the circular saw blade 3 from the other end to the one end side that cannot be covered by the saw cover main body 41. The circular saw blade 3 is exposed between the one end side of the saw cover main body 41 and the safety cover 42, and the circular saw 1 cleaves from the other end to the one end side of the saw cover main body 41 while the exposed portion is used to cut to-be-processed members. Therefore, the direction from the other end to the one end side of the saw cover main body 41 is defined as a cutting direction, and the one end and other end sides of the saw cover main body 41 are defined, respectively, as front and rear in the cutting direction.

Figure 5A:
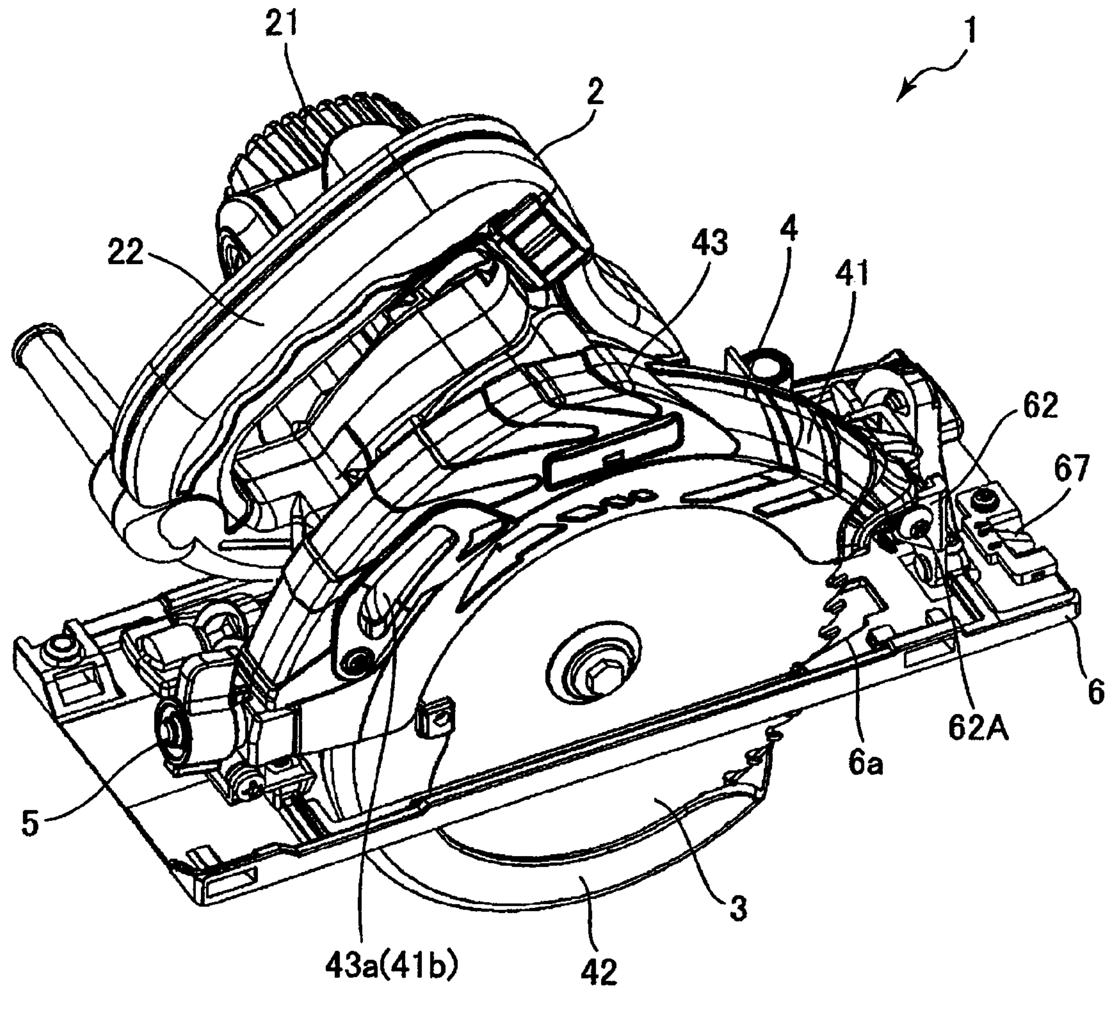
FIG. 5A is a perspective view showing a state where a guide cover is mounted in the portable cutting machine according to the embodiment of the present invention.
Figure 5B:
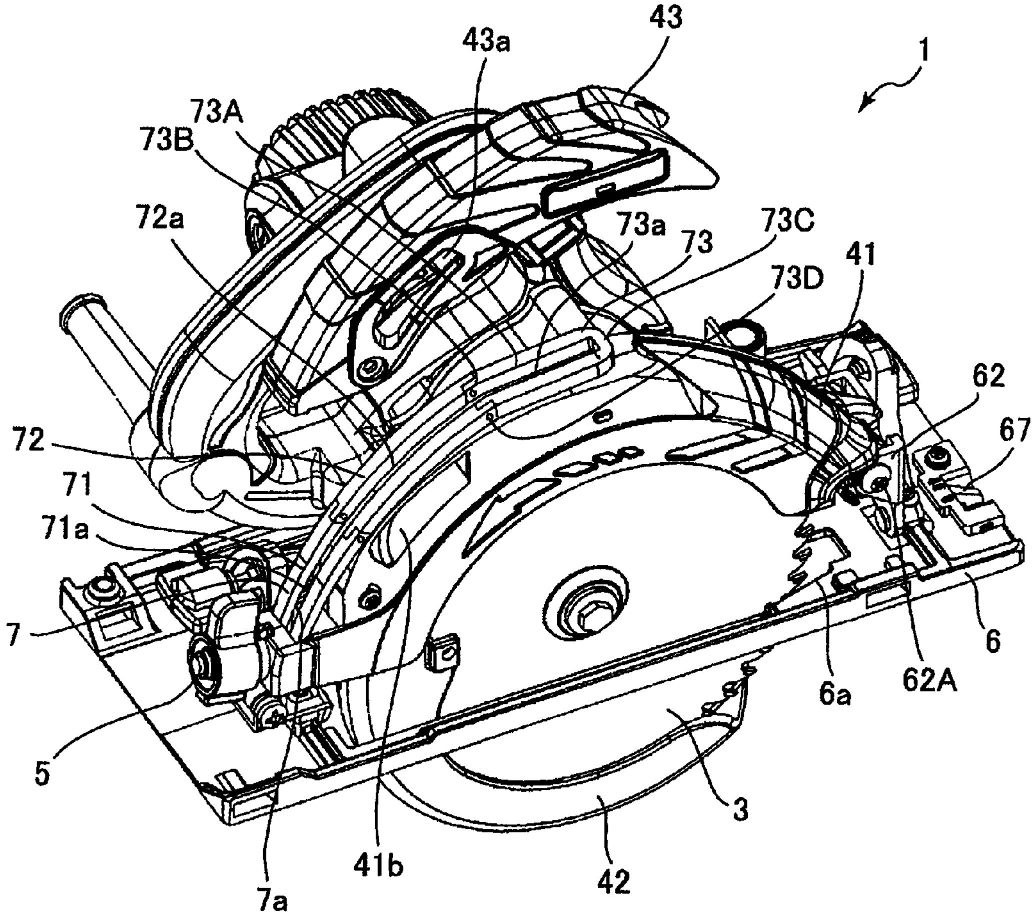
FIG. 5B is a perspective view showing a state where the guide cover is dismounted in the portable cutting machine according to the embodiment of the present invention.

The guide cover 43 is made of resin, and is provided detachably to the upper surface of the saw cover main body 41. FIGS. 5A and 5B are perspective views of the circular saw 1, respectively, when the guide cover 43 is mounted and dismounted on/from the saw cover main body 41. As shown in FIG. 5A, the guide cover 43 is mounted on the saw cover main body 41 to cover the link 7 to be described hereinafter. In the side surface of the guide cover 43, an opening portion 43*a* is formed at a position corresponding to that of the opening portion 41*b* formed in the saw cover main body 41.

As shown in FIG. 1, the base 6 consists mainly of a base member 61 and a rotation support axis 62, and supports the housing 2, circular saw blade 3, and saw cover 4 rotatably with respect to the saw cover 4. The base member 61, which is a main component of the base 6, is made of metal and formed by an approximately rectangular board. The base member 61 is arranged in such a manner that the longitudinal direction thereof corresponds to the cutting direction, and an elongated opening portion 6*a* extending in the longitudinal direction is formed in the surface of the base member 61. The base member 61 is also arranged in such a manner that the circular saw blade 3 and the safety cover 42 can be inserted into the opening portion 6*a*. Further, a contact surface 61A to be in contact with to-be-processed members is defined on the surface of the base member 61 opposite to that on which the rotation support axis 62 is provided.

As shown in FIG. 1, in the base member 61, the rotation support axis 62 and an indication part 67 for indicating a cutting point are provided in front of the opening portion 6*a* in the cutting direction. The indication part 67 is provided at the leading end of the base member 61 in the cutting direction and at a position where a plane including the circular saw blade 3 intersects. The rotation support axis 62 includes a pair of arm portions extending rearward in the cutting direction, and the arm portions are provided with a rotation axis portion 62A, the axial direction of which corresponds to the direction orthogonal to the cutting direction. The connection 41A, which is positioned in the front of the saw cover main body 41 in the cutting direction, is pivotally supported by the rotation axis portion 62A.

As shown in FIG. 3, in the base member 61, a connection piece 65 connectable with the link 7 and a rotation pin 65A for pivotally and rotatably supporting the link 7 are provided in rear of the opening portion 6*a* in the cutting direction and outside the circular saw blade 3 in the radial direction.

As shown in FIG. 5B, the link 7 is covered with the guide cover 43 when the guide cover 43 is mounted on the saw cover main body 41. The link 7 is formed with a guide passage 7*a* extending from the base 6 along the saw cover main body 41 to guide the movement restricting part 5 slidably. As shown in FIGS. 3 and 5B, the link 7 consists mainly of a lower guide member 71 connected to the base 6, a middle guide member 72, and an upper guide member 73. When the amount of protrusion of the circular saw blade 3 is minimum, the link 7 is fixed on a circular arc that the movement restricting part 5 follows when the saw cover 4 is rotated centering on the rotation support axis 62. Also, when the amount of protrusion of the circular saw blade 3 is maximum, the movement restricting part 5 is fixed to the lower guide member 71, while the middle and upper guide members 72 and 73 are in contact with the outer periphery of the saw cover main body 41. In addition, the guide members 71 to 73 are each formed by a metal plate having approximately the same thickness. It is noted that the thickness of each guide member refers to the length of the bolt 51 of the movement restricting part 5 in the axial direction.

Figure 6:
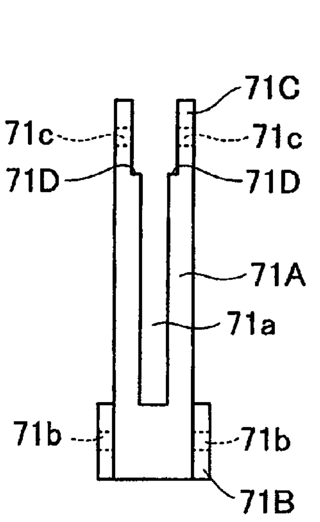
FIG. 6 is a plan view of a first guide member in the portable cutting machine according to the embodiment of the present invention.

As shown in FIG. 6, the lower guide member 71 consists mainly of a guide portion 71A extending in an approximately arc shape, a base end portion 71B provided at the base end of the guide portion 71A and connected to the connection piece 65 of the base 6, and a connecting portion 71C for connecting the middle guide member 72.

Figure 8A:
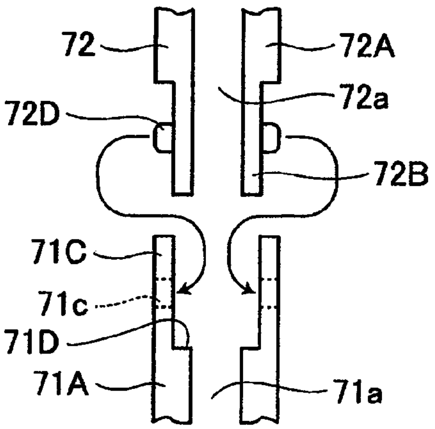
Figure 8B:
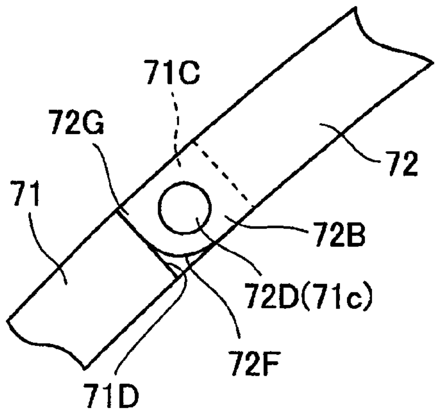
Figure 8C:
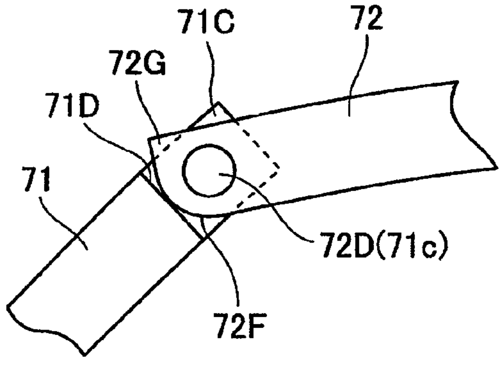
FIG. 8C is a side view showing a rotatable state between the first and second guide members in the portable cutting machine according to the embodiment of the present invention.

The guide portion 71A is formed with an elongated hole 71*a* extending in the longitudinal direction of the lower guide member 71, through which the bolt 51 is to be inserted and slide. The base end portion 71 is formed with an axis hole 71*b* having a diameter approximately greater than that of the rotation pin 65A, through which to be connected with the base 6. As shown in FIGS. 8A to 8C, the connecting portion 71C has an axis hole 71*c* and a contact surface 71D. Since the connecting portion 71C has the same arrangement as the connecting portion 72C of the middle guide member 72, the details will be described below.

Figure 7:
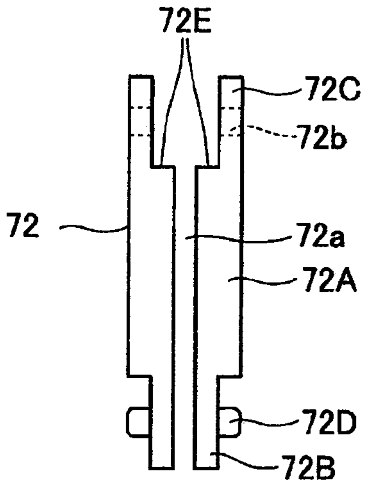
FIG. 7 is a partial plan view of a second guide member in the portable cutting machine according to the embodiment of the present invention.

As shown in FIG. 7, the middle guide member 72 is composed of two bilaterally-symmetric members facing each other. The middle guide member 72 consists mainly of a guide portion 72A through which the bolt 51 is to be inserted, an axis portion 72B on the side nearer the base, and a connecting portion 72C on the side farther from the base. The guide portion 72A has a passage 72*a* formed by arranging two members separately with a space having approximately the same width as that of the elongated hole 71*a*. The axis portion 72B is formed continuously with the guide portion 72A nearer the passage 72*a* by one step in relation to the guide portion 72A. Specifically, the axis portion 72B has a width approximately half of that of the guide portion 72A. A projection 72D projecting toward the side opposite to the passage 72*a* is provided on each side surface of the axis portion 72B. Also, as shown in FIGS. 8A to 8C, the axis portion 72B has a circular arc portion 72F positioned nearer the circular saw blade 3 in the thickness direction of the middle guide member 72 and an angled portion 72G positioned farther from the circular saw blade 3. Meanwhile, as shown in FIG. 7, the connecting portion 72C is formed with an axis hole 72*b* having a diameter approximately greater than that of the projection 72D and a contact surface 72E formed due to the difference in thickness between the guide portion 72A and the connecting portion 72C. The connecting portion 72C is formed continuously with the guide portion 72A farther from the passage 72*a* by one step in relation to the guide portion 72A. Specifically, the connecting portion 72C has a width approximately half of that of the guide portion 72A and has a shape corresponding to that of the axis portion 72B. It is noted that the connecting portion 71C of the lower guide member 71 has the same arrangement as the connecting portion 72C of the middle guide member 72, where the axis hole 71*c* and the contact surface 71D correspond, respectively, to the axis hole 72*b* and the contact surface 72E.

As shown in FIG. 8B, the projection 72D provided on the axis portion 72B of the middle guide member 72 is engaged with the axis hole 71*c* formed in the connecting portion 71C of the lower guide member 71 so that the lower and middle guide members 71 and 72 are connected rotatably with each other. In this case, when the angled portion 72G of the axis portion 72B of the middle guide member 72 and the contact surface 71D of the lower guide member 71 are in contact with each other, the middle guide member 72 is fixed non-rotatably. That is, the middle guide member 72, which is rotatable within the range where the circular arc portion 72F of the axis portion 72B of the middle guide member 72 and the contact surface 71D of the lower guide member 71 are in contact with each other, is fixed rotatably toward the circular saw blade 3, while non-rotatably away from the circular saw blade 3. It is therefore possible to define a range within which the guide member can be rotated at low cost.

As shown in FIG. 5B, the upper guide member 73 has a guide portion 73A formed with an elongated hole 73*a* and an axis portion 73B provided with a projection 73D, as is the case with the middle guider member 72, and further consists mainly of a leading end portion 73C. The leading end portion 73C is formed continuously with the guide portion 73A to define a range within which the bolt 51 can slide.

Each axis portion is engaged with each connecting portion so that the guide members are connected rotatably with each other. Specifically, as shown in FIGS. 8A and 8B, the projection 72D provided on the axis portion 72B of the middle guide member 72 is engaged with the axis hole 71*c* formed in the connecting portion 71C of the lower guide member 71 so that the middle guide member 72 is supported pivotally and rotatably centering on the projection 72D with respect to the lower guide member 71. Also, the projection 73D provided on the axis portion 73B of the upper guide member 73 is engaged with the axis hole 72*b* formed in the connecting portion 72C of the middle guide member 72 so that the upper guide member 73 is supported pivotally and rotatably centering on the projection 73D with respect to the middle guide member 72.

Further, as shown in FIG. 5B, when the guide members are connected with each other, the elongated hole 71*a*, passage 72*a*, and elongated hole 73*a* in the guide members communicate with each other, which corresponds to the guide passage 7*a* through which the bolt 51 of the movement restricting part 5 can slide. That is, the bolt 51 can move in a sliding manner between the base end portion 71B of the lower guide member 71 and the leading end portion 73C of the upper guide member 73.

Figure 9:
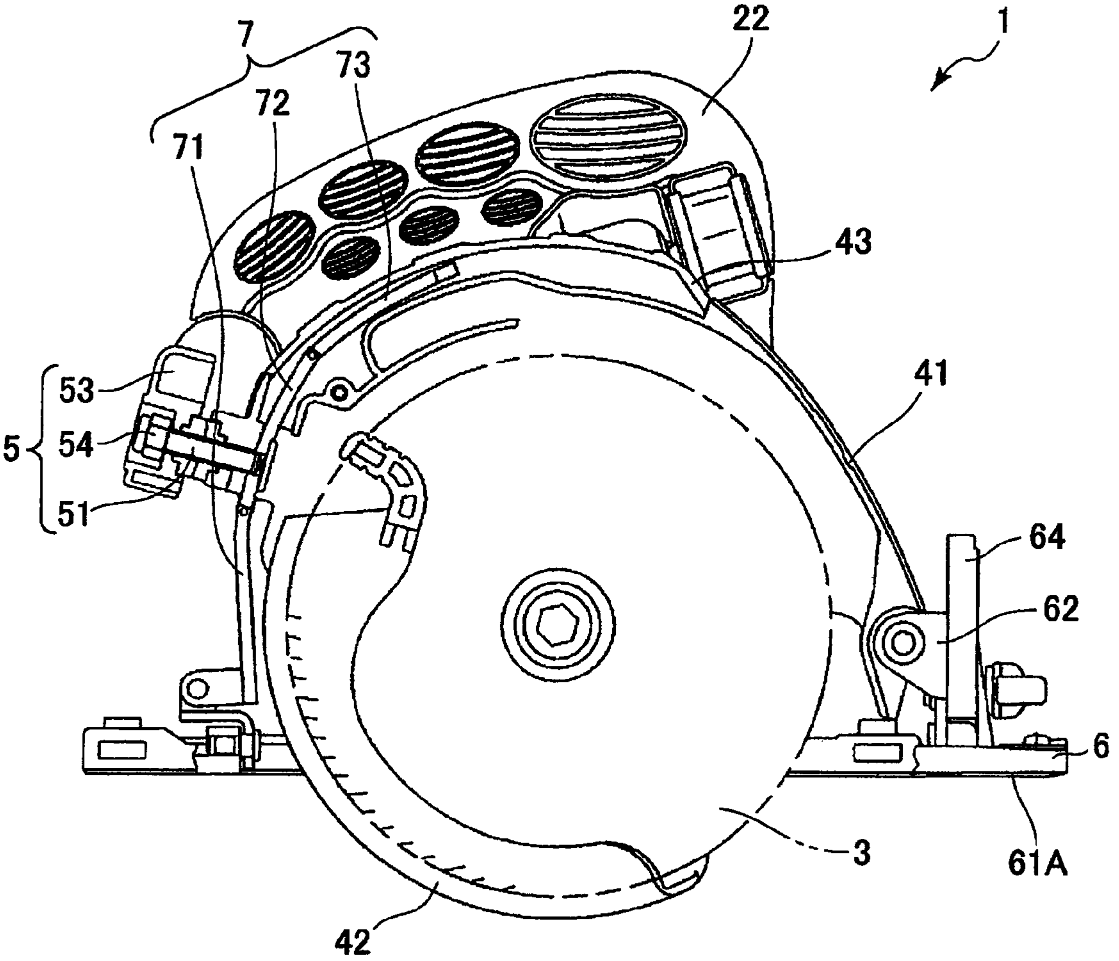
FIG. 9 is a cross-sectional view when the amount of protrusion of a cutting blade is changed in the portable cutting machine according to the embodiment of the present invention.

As shown in FIG. 9, the amount of protrusion of the circular saw blade 3 can be changed by rotating the housing 2 and saw cover 4 around the rotation axis portion 62A of the rotation support axis 62. Specifically, the link 7 and the saw cover main body 41 slide with each other by causing the bolt 51 of the movement restricting part 5 connected with the saw cover 4 to slide through the guide passage 7*a* of the link 7 (refer to FIG. 5B). In this case, the housing 2 and saw cover 4 rotate clockwise in FIG. 9 centering on the rotation axis portion 62A with respect to the base 6. This results in a change in the amount of protrusion from the contact surface 61A to the lower end of the circular saw blade 3. It is noted that the amount of protrusion of the circular saw blade 3 is maximum when the movement restricting part 5 is in contact with the base end portion 71B of the lower guide member 71, while is minimum when the movement restricting part 5 is in contact with the leading end portion 73C of the upper guide member 73.

As shown in FIG. 3, when the amount of protrusion of the circular saw blade 3 is maximum, the bolt 51 of the movement restricting part 5 is positioned lower than the connecting portion 71C of the lower guide member 71. In this case, the middle and upper guide members 72 and 73 are arranged outside of the saw cover 4 and brought into contact with the outer periphery of the saw cover 4 so as to be supported by the circular saw blade 3 in a contactless manner.

As shown in FIG. 9, when the amount of protrusion of the circular saw blade 3 is changed, the bolt 51 of the movement restricting part 5 is positioned within the passage 72*a* of the middle guide member 72, and the saw cover 4 and the middle guide member 72 are fastened so that the movement of the middle guide member 72 is restricted with respect to the saw cover 4, the middle guide member 72 is fixed non-rotatably with respect to the lower guide member 71. Specifically, the middle guide member 72 is fastened to the saw cover 4 while being pulled with a force applied in the direction from the rotation support axis 62 toward the movement restricting part 5. In this case, when the angled portion 72G of the axis portion 72B of the middle guide member 72 and the contact surface 71D on the connecting portion 71C of the lower guide member 71 are in contact with each other, the middle guide member 72 is fixed non-rotatably away from the circular saw blade 3 and pulled by the movement restricting part 5, and thereby cannot be tilted toward or away from the circular saw blade 3.

Meanwhile, when the bolt 51 of the movement restricting part 5 is positioned within the passage 72*a* of the middle guide member 72 and the saw cover 4 and the middle guide member 72 are fastened so that the movement of the middle guide member 72 is restricted with respect to the saw cover 4, the upper guide member 73, which is rotatable with respect to the middle guide member 72, is in contact with and supported by the upper surface of the saw cover 4.

Also, when the bolt 51 of the movement restricting part 5 is positioned within the elongated hole 73*a* of the upper guide member 73 and the saw cover 4 and the upper guide member 73 are fastened so that the movement of the upper guide member 73 is restricted with respect to the saw cover 4, the upper guide member 73 is fastened to the saw cover 4 while being pulled with a force applied by the movement restricting part 5 in the direction from the rotation support axis 62 toward the movement restricting part 5, as is the case with the middle guide member 72 when the saw cover 4 and the middle guide member 72 are fastened. In this case, the middle and lower guide members 72 and 71 are fixed together non-rotatably with respect to the base 6.

In the conventional arrangement in which the movement restricting part is positioned farther from the base with respect to the rotation support portion when the link is divided vertically and the amount of protrusion of the cutting blade is maximum, since the lower link is not used for changing the amount of protrusion of the cutting blade but serves only as a support for the upper link, the lower link is formed as small as possible. However, if the upper link is formed in a larger size to ensure a sufficient movable range for the movement restricting part, a larger space is required to house the upper link, resulting in an increase in the size of the portable cutting machine.

Meanwhile, according to the circular saw 1 of the foregoing embodiment of the present invention, since the movement restricting part 5 is positioned nearer the base 6 with respect to the rotation support axis 62 at least when the amount of protrusion of the circular saw blade 3 is maximum, the elongated hole 71*a* of the lower guide member 71 constitutes part of the guide passage 7*a* within a range which the movement restricting part 5 can slide. That is, it is only required that the lower, middle, and upper guide members 71, 72, and 73 provide a movable range equivalent to that for the movement restricting part by the conventional upper link, and there is no need to increase the size of the circular saw 1 even if the lower guide member 71 may be formed in a larger size. Further, at least when the amount of protrusion of the circular saw blade 3 is maximum, only a smaller space may be required to house the middle and upper guide members 72 and 73 by rotating the middle and upper guide members 72 and 73 with respect to the lower guide member 71, whereby the size of the circular saw 1 can be reduced. In addition, the tensile force by the movement restricting part 5 can be reduced by rotating the middle and upper guide members 72 and 73, which allows the movement restricting part 5 to slide smoothly, resulting in an improvement in workability.

Also, the guide member positioned nearer the base 6 with respect to the guide member, the movement of which with respect to the saw cover 4 is restricted by the movement restricting part 5, is fixed non-rotatably with respect to adjacent guide members, whereby the link 7 and the saw cover 4 are fixed to each other with no loosening at a given position. Further, since multiple guide members and multiple rotation support portions are included, the link 7 can be deformed freely through the rotation of each guide member even if it may not have elasticity, which allows the movement restricting part 5 to be guided smoothly. Consequently, there is no need that each guide member should be formed by an elastic thin plate, and the strength can be increased using a thick plate.

In addition, the guide member positioned farther from the base 6 with respect to the guide member, the movement of which with respect to the saw cover 4 is restricted by the movement restricting part 5, is rotatable with respect to adjacent guide members, only a smaller space may be required to house the guide members, whereby the size of the portable cutting machine can be reduced.

Also, since the guide members are supported along the outer periphery of the circular saw blade 3 in a plane including or parallel to the side surface of the circular saw blade 3, the movement restricting part 5 can be guided smoothly along the guide passage 7*a* when moved away from the base 6.

Moreover, the movement restricting part 5 is adapted to restrict the movement of the link 7 with respect to the saw cover 4 by rotating the rotation operating part 53 and thereby moving the axis portion 51A relatively in the axial direction so that the link 7 is engaged with the collar portion 51B, whereby the movement of the link 7 with respect to the saw cover 4 can be easily restricted by operating the rotation operating part 53.

Furthermore, since the guide members are each formed to have approximately the same thickness in the direction where the axis portion 51A of the movement restricting part 5 protrudes, there is no need to prepare a specific movement restricting part 5 for each guide member. Specifically, since the axis portion 51A moves by the same distance when restricting the movement of the link 7 with respect to the saw cover 4, identical movement restricting parts 5 may be used.

Also, since the guide member positioned farther from the base 6 with respect to the guide member, the movement of which with respect to the saw cover main body 41 is restricted by the movement restricting part 5, is arranged outside of the saw cover main body 41, chips generated inside of the saw cover main body 41 cannot attach to the guide members. Therefore, there is no possibility that chips attached to the guide members become resistance to interfere with the sliding of the movement restricting part 5 with respect to the guide members. Also, since there is no need to ensure a space for housing the guide members inside the saw cover main body 41, the size of the saw cover main body 41 can be reduced. Further, the guide member positioned farther from the base with respect to the guide member, the movement of which with respect to the saw cover main body 41 is restricted by the movement restricting part 5, can be replaced, if desired, without dismounting the saw cover main body 41 from the base 6. Furthermore, the guide member positioned farther from the base with respect to the guide member, the movement of which with respect to the saw cover main body 41 is restricted by the movement restricting part 5, can also be replaced, if desired, without dismounting the saw cover main body 41 from the base 6, which exhibits an improved assemblability.

Further, extraneous shocks can be absorbed by the guide cover 43, which is formed detachably to the saw cover main body 41 to cover the guide member positioned farther from the base 6 with respect to the guide member, the movement of which with respect to the saw cover main body 41 is restricted by the movement restricting part 5, which can prevent the link 7 from being deformed. Although the circular saw 1 is often used in environments where dust such as wood debris circulates, the provision of the guide cover 43 can prevent dust circulating outside from attaching to the guide member positioned outside of the saw cover main body 41.

Also, since the guide cover 43 is formed detachably to the saw cover main body 41, maintenance operations such as cleaning of the link 7 and saw cover main body 41 can be easily performed by dismounting the guide cover 43 from the saw cover main body 41, which exhibits an improved workability.

In addition, the housing 2 is formed with the handle part 22 that protrudes from the housing 2 toward the side opposite to the circular saw blade 3, and the handle part 22 and guide cover 43 are each formed of resin. Therefore, even if the circular saw 1 may be placed on an installation surface such as a floor in such a manner that the vicinity of the handle part and guide cover is in contact with the installation surface, the installation surface is less likely to be damaged, which exhibits an improved convenience.

Figure 10A:
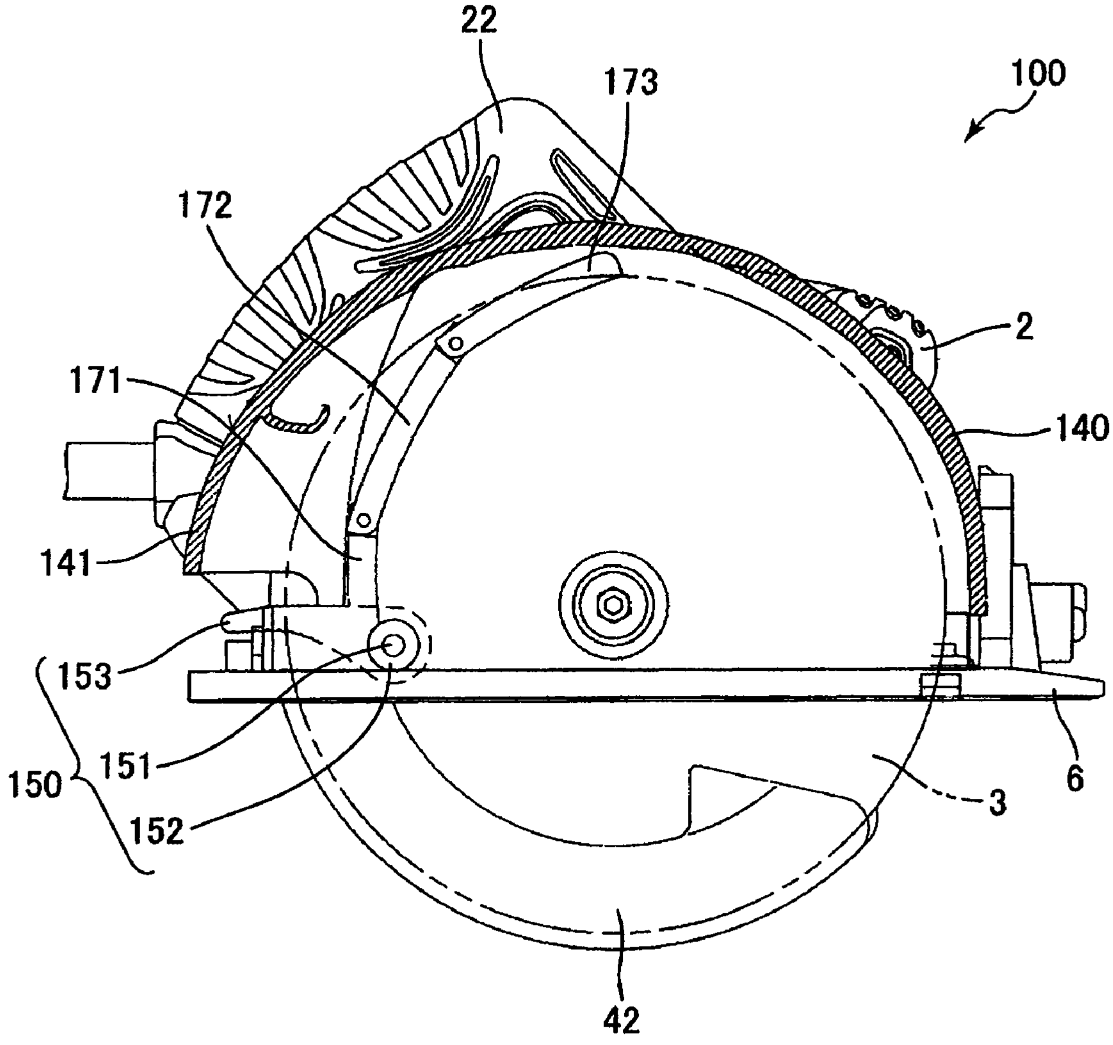
FIG. 10A is a cross-sectional view when the amount of protrusion of a cutting blade according to an exemplary variation is maximum in the portable cutting machine according to the embodiment of the present invention.
Figure 10B:
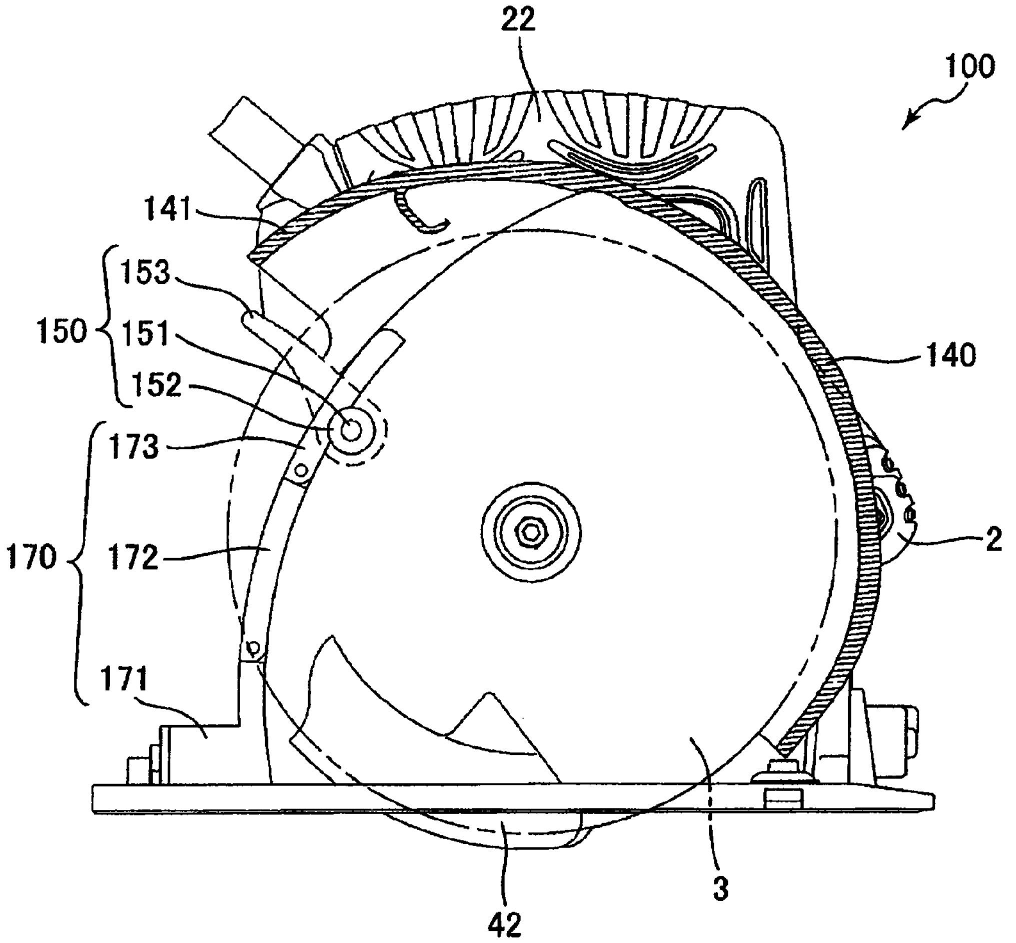
FIG. 10B is a cross-sectional view when the amount of protrusion of the cutting blade according to the exemplary variation is changed in the portable cutting machine according to the embodiment of the present invention.

It is noted that the portable cutting machine according to the present invention is not restricted to the above-described embodiment, and it will be appreciated that various modifications may be made within the scope of the claims. For example, the arrangement shown in FIGS. 10A and 10B may be employed. A circular saw 100 according to an exemplary variation will now be described. FIG. 10A shows the circular saw 100 with the amount of protrusion of the circular saw blade 3 being maximum, while FIG. 10B shows the circular saw 100 with the amount of protrusion being reduced. In the circular saw 100, the link 170 is provided on a plane parallel to the side surface of the circular saw blade 3 and at a position not to be in contact with the circular saw blade 3. The movement restricting part 150 includes a bolt 151 extending orthogonally to the side surface of the circular saw blade 3, a rotation operating part 53 arranged within the passage of the adjustment guide 170 to be in contact with the link 170 and rotatable centering on the axial center of the bolt 151, a nut 152 to be in contact with and urge the adjustment guide 170 by rotating the rotation operating part 53, and a lever portion 153. The lever portion 153 is adapted to move the nut 152 and saw cover 140 together with the bolt 151, rotation operating part 53, and nut 152 integrally along the passage of the link 170.

According to the arrangement above, since the link 170 is provided on a plane parallel to the side surface of the circular saw blade 3 and at a position not to be in contact with the circular saw blade 3, the adjustment guide 170 can be formed smaller than the outer periphery of the circular saw blade 3. This allows the saw cover 140 to be formed in a smaller size, and thereby the size of the circular saw 100 can be reduced.

Figure 11A:
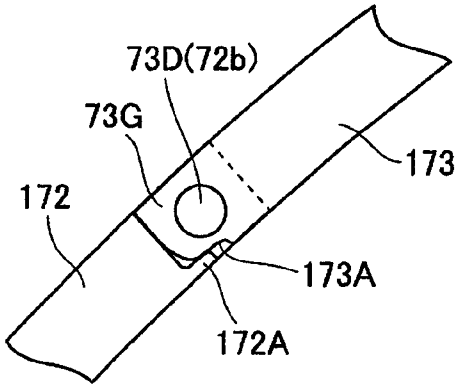
Figure 11B:
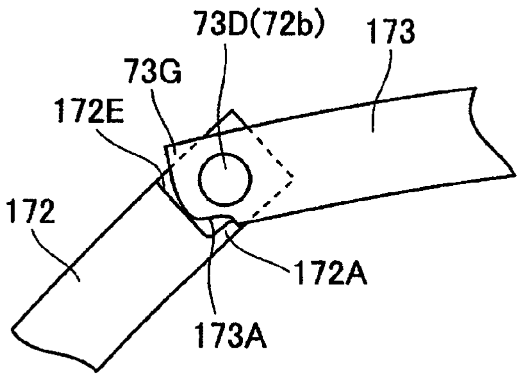
FIG. 11B is a side view showing a rotatable state between the guide members according to the exemplary variation in the portable cutting machine according to the embodiment of the present invention.
Figure 12A:
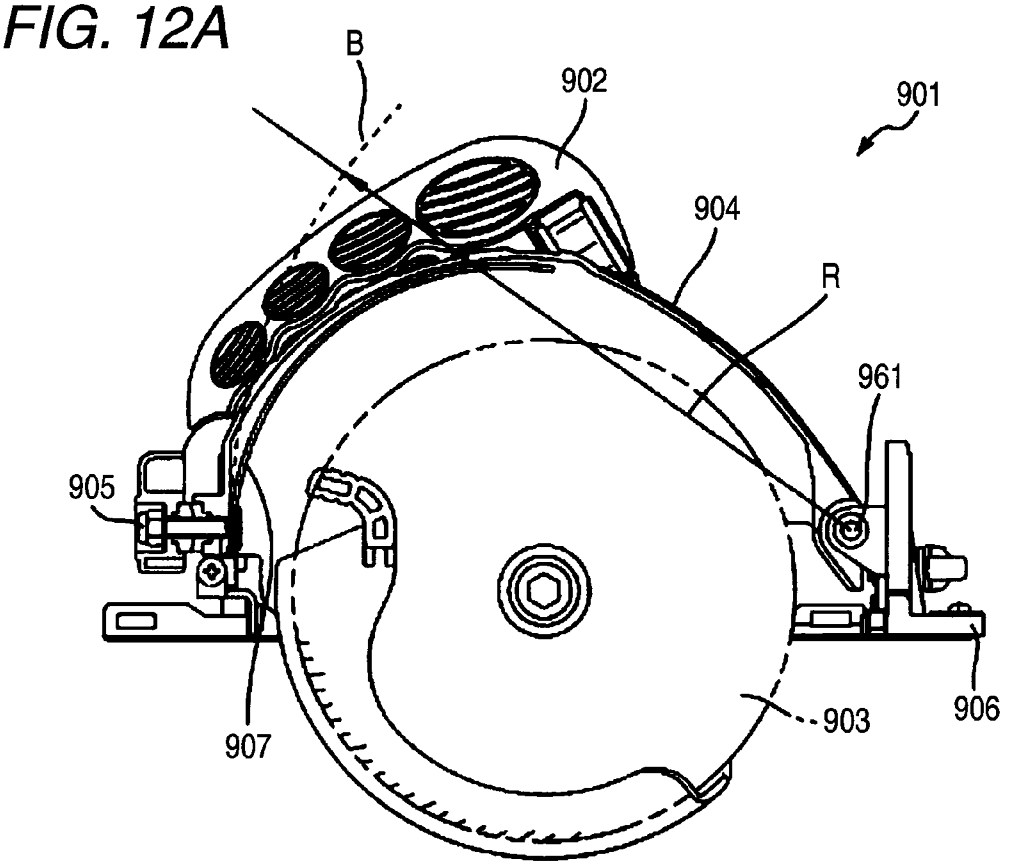
FIG. 12A is a cross-sectional view when the amount of protrusion of a cutting blade is maximum in a conventional portable cutting machine.
Figure 12B:
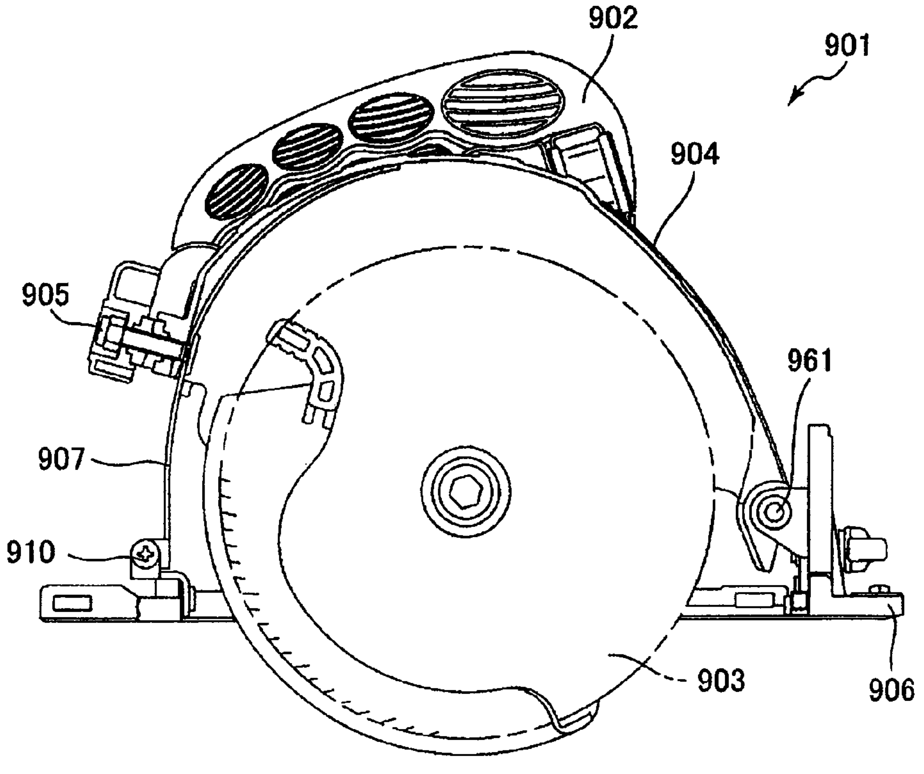
FIG. 12B is a cross-sectional view when the amount of protrusion of the cutting blade is changed in the conventional portable cutting machine.

Also, the portable cutting machine 1 according to the above-described embodiment is arranged in such a manner that when the middle guide member 72 is fastened to the saw cover main body 41 and the movement with respect to the saw cover main body 41 is restricted by the movement restricting part 5, the upper guide member 73 positioned farther from the base 6 with respect to the guide member, the movement of which with respect to the saw cover main body 41 is restricted, is supported on the upper surface of the saw cover main body 41, but not restricted thereto. For example, as shown in FIGS. 11A and 11B, a restriction piece 172A may be provided on the connecting portion of the middle guide member 172 and a restriction surface 173A contactable with the restriction piece 172A may be formed on the axis portion of the upper guide member 173 to restrict the rotation angle of the upper guide member 173. The connecting portion of the lower guide member 171 and the axis portion of the middle guide member 172 may also be arranged in the same manner.

According to the arrangement above, it is possible to prevent the link 170 from coming into contact with the circular saw blade 3 due to excessive rotation of the guide members toward the circular saw blade 3 even if the link 170 may be provided inside of the saw cover 140.

Further, the restriction piece 172A is provided on the connecting portion of the middle guide member 172, which can prevent an increase in the number of parts as well as define a range within which the upper guide member 173 can be rotated at low cost.

The circular saw 1 according to the above-described embodiment is also arranged in such a manner that one middle guide member 72 is provided between the lower and upper guide members 71 and 73, but multiple middle guide members may be provided between the lower and upper guide members 71 and 73. This arrangement allows the link to be deformed more freely, and thus the movement restricting part 5 can be guided more smoothly.

It is noted that the embodiment employs an arrangement that the movement of the link 7 can or cannot be restricted with respect to the saw cover main body 41 by rotating the operating part and therefore the bolt 51, but the present invention is not restricted thereto, and another arrangement may be employed that the movement of the link can or cannot be restricted with respect to the saw cover by, for example, rotating the operating part and using cam means or the like.

What is claimed is:

1. A portable cutting machine comprising:
- a housing;
- a motor housed in the housing;
- a cutting blade adapted to be driven by the motor to cut to-be-processed members;
- a saw cover attached to the housing to cover approximately the half of the outer periphery of the cutting blade;
- a base adapted to rotatably support the saw cover or the housing and to be brought into contact with the to-be-processed members; and
- a protrusion amount changing mechanism capable of changing the amount of protrusion of the cutting blade from the base toward the side opposite to the saw cover,
- wherein the protrusion amount changing mechanism has an adjustment guide extending from the base in the rotation direction of the saw cover and a movement restricting part for restricting the movement of the adjustment guide with respect to the saw cover,
- wherein the portion of the adjustment guide on the side farther from the base with respect to the movement restricting part is arranged outside of the saw cover, and
- wherein the saw cover comprises:
  - an opening portion formed on a surface of the saw cover farther from the motor;
  - an air passage communicating from a front of the cutting blade in the cutting direction of the cutting machine to the opening portion: and
  - a guide portion formed in the air passage in the vicinity of the opening portion so as to guide air being generated by a rotation of the cutting blade and flowing into the air passage toward the opening portion, and wherein the portion of the adjustment guide on the side farther from the base with respect to the movement restricting part is accommodated within a space defined by a resin-made guide cover that is detachably attached to the saw cover, and wherein the guide cover has an opening portion formed at a position corresponding to that of the opening portion of the saw cover.

2. The portable cutting machine according to claim 1, wherein the guide cover covers the portion of the adjustment guide on the side farther from the base with respect to the movement restricting part.

3. The portable cutting machine according to claim 2, wherein the housing is formed with a handle part protruding from the housing toward the side opposite to the cutting blade, and the handle part and the guide cover are each formed of resin.

* * * * *